US011036474B2

(12) United States Patent
Caldwell et al.

(10) Patent No.: US 11,036,474 B2
(45) Date of Patent: Jun. 15, 2021

(54) AUTOMATING SERVICE MATURITY ANALYSIS AND ESTIMATION

(71) Applicants: ATLASSIAN PTY LTD, Sydney (AU); ATLASSIAN, INC., San Francisco, CA (US)

(72) Inventors: Samuel Caldwell, Mountain View, CA (US); Patrick Hill, Austin, TX (US)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

(21) Appl. No.: 16/234,435

(22) Filed: Dec. 27, 2018

(65) Prior Publication Data

US 2020/0210149 A1 Jul. 2, 2020

(51) Int. Cl.
| | |
|---|---|
| *G06F 9/44* | (2018.01) |
| *G06F 9/445* | (2018.01) |
| *G06F 8/20* | (2018.01) |
| *G06F 9/54* | (2006.01) |
| *H04L 29/06* | (2006.01) |

(52) U.S. Cl.
CPC .............. *G06F 8/20* (2013.01); *G06F 9/547* (2013.01); *H04L 63/1433* (2013.01)

(58) Field of Classification Search
CPC ......... G06F 8/20; G06F 9/547; H04L 63/1433
See application file for complete search history.

(56) References Cited

U.S. PATENT DOCUMENTS

| | | | |
|---|---|---|---|
| 10,282,546 B1* | 5/2019 | Parikh | G06F 21/566 |
| 2009/0126012 A1* | 5/2009 | Treadwell | G06F 21/56 |
| | | | 726/22 |
| 2016/0094401 A1* | 3/2016 | Anwar | G06F 11/3006 |
| | | | 709/223 |
| 2016/0371426 A1* | 12/2016 | Samiotakis | G16B 15/00 |
| 2017/0034023 A1* | 2/2017 | Nickolov | H04L 43/0817 |
| 2017/0061126 A1* | 3/2017 | Hooks | H04L 63/1441 |
| 2018/0069875 A1* | 3/2018 | Ben Ezra | H04L 63/1441 |
| 2018/0069876 A1* | 3/2018 | Ben Ezra | H04L 63/1416 |
| 2018/0218149 A1* | 8/2018 | Jacobs | G06F 21/56 |

(Continued)

OTHER PUBLICATIONS

Amal Alhosban, Integrating Fault-Tolerance Method into Service-Oriented Computing, 2015, pp. 161-168. https://ieeexplore.ieee.org/stamp/stamp.jsp?tp=&arnumber=7133525&isnumber=7133490 (Year: 2015).*

(Continued)

*Primary Examiner* — Mongbao Nguyen
(74) *Attorney, Agent, or Firm* — Brownstein Hyatt Farber Schreck, LLP (57) ABSTRACT

Techniques for computer-implemented automation of analysis of service maturity and automation of estimation of service maturity for software applications and services are provided, identifying a service to determine the service maturity level compared to an identified task comprising optimal service maturity criteria. In response to identifying the service and task, determining that each criteria of the task is met by the service. Subsequently, updating a score for the overall task and the individual criteria based on the total service conformity to the criteria. The scores and differences can be displayed in an interface to indicate the maturity of the service.

17 Claims, 7 Drawing Sheets

(56) References Cited

U.S. PATENT DOCUMENTS

| | | | |
|---|---|---|---|
| 2019/0124144 A1* | 4/2019 | Isci ........................ | H04L 63/108 |
| 2019/0205162 A1* | 7/2019 | Kalajan .................. | G06F 9/4881 |
| 2019/0207968 A1* | 7/2019 | Heckman ........... | G06Q 10/0635 |
| 2019/0243702 A1* | 8/2019 | Shilane ................. | G06F 16/273 |
| 2019/0245918 A1* | 8/2019 | Xu ....................... | G06F 16/1744 |
| 2019/0268233 A1* | 8/2019 | Singh ...................... | H04L 43/08 |
| 2019/0334940 A1* | 10/2019 | Bar Noy ............. | G06F 16/2379 |
| 2020/0026580 A1* | 1/2020 | Bahramshahry ...... | G06F 9/4418 |
| 2020/0057864 A1* | 2/2020 | Parthasarathy ..... | G06F 21/6245 |
| 2020/0092374 A1* | 3/2020 | Mehta ................... | G06F 21/121 |
| 2020/0159912 A1* | 5/2020 | Cervantez ............... | G06F 21/53 |

OTHER PUBLICATIONS

Tugrul Asik, Policy Enforcement upon Software Based on Microservice Architecture, 2017, pp. 283-287. https://ieeexplore.ieee.org/stamp/stamp.jsp?tp=&arnumber=7965739&isnumber=7965690 (Year: 2017).*

* cited by examiner

AUTOMATING SERVICE MATURITY ANALYSIS AND ESTIMATION

FIELD OF THE DISCLOSURE

One technical field of the present disclosure is computer-implemented automation of analysis of the apparent maturity of computer programs implementing services, and automation of the estimation of service maturity for software applications and services. Another technical field is distributed computer systems, specifically programs that provide services to other programs and may be implemented as containerized micro-services.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Creating, editing, implementing and collaborating on the development of computer software implementing services continue to present challenges for programmers. The problems constantly intensify as software becomes more interconnected, and services become more complex. Developers must amass larger teams to complete functional, reliable and intuitive software projects. The sheer amount of data included in a project continues to grow and the number of programmers needed to complete the project continues to grow as well. These increases have created problems for software creators by increasing the amount of code that must be reviewed for conformance to individual, team, or company guidelines and preferences. For example, multiple individual programmers who are tasked with creating and implementing multiple components of a software service have a high probability of using different styles and practices when writing source code. Services requiring high degrees of reliability, security, and/or intuitiveness may be subject to requirements that all data and files comprising the service conform to very specific standards to remain functional.

Furthermore, services containing non-conforming data may slow a system and create inefficiency because elements of the service execute in conflict with each other. End-users relying on the service employing non-conforming components may be subject to any number of security, efficiency, or reliability problems arising from deficiencies in the service. For example, if one component of a service does not adhere to security guidelines present in all other components in the service, the service is vulnerable to attack, breach, theft or other issues due to a singular deficiency in a singular non-conforming component.

Additionally, in the enterprise context, employees unfamiliar with the programming practices of a software team or business may be unaware that such practices exist or simply forget to include such practices in any programming work as part of a project. For example, a new employee may be unaware that each member of a team of software developers uses a particular practice of linking a specific library of files to a project and never using a newer untested version of the library. If the new employee links a newer library to source code in her project files, the entirety of the service may crash when the team implements a full version of the service.

SUMMARY

The appended claims may serve as a summary of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, a computer system executes a method whereby the method receives first input identifying a computer program that is currently executing and that is implemented as a microservice, the program comprising one or more service components. The computer system executed method then receives second input identifying a task comprising a task score and one or more checks, each check comprising a check score, one or more of criterion, and corresponding to a service component. While the computer program continues executing, the computer system executed method further determines, for each check, whether the corresponding service component satisfies one or more criterion in the check and updates the check score for each check, based on whether the corresponding service components satisfies one or more criterion in the check. The computer system executed method then updates the task score based, at least on, the average of one or more of the check scores; and causes displaying the updated task score and the one or more updated check scores. Other aspects, features and embodiments will become apparent from the disclosure as a whole, including the appended claims and drawings.

Example Processes for Automated Estimation of Maturity of a Computer Program Implementing a Service In this disclosure, "maturity" refers to conformance of a computer program, implementing a service, to one or more metrics used to determine how closely a service conforms to a set of criteria the service should optimally employ. A fully mature service conforms to all principles deemed appropriate for that service to contain. By contrast, an "immature" service contains one or more aspects which do not conform to the criteria, are missing a portion of the criteria altogether, or contain an element which should not be present.

Embodiments recognize that determining the maturity of a service by manual means has distinct limitations, and improvements are needed. For example, it may be possible to teach all programmers or members of the team the best practices to produce mature software and trust that the programmers will implement service components conforming with the best practices criteria on their own. This approach is inefficient and is endangered by the introduction of persons unaware of the practices or the use of persons who have already been taught the best practices and cannot remember them. Or, a human team member may read each line of source code to search for non-conforming aspects of a service component for each component of a service. This also is a highly inefficient practice, wastes valuable time for both the programmer and the reviewer, and is not scalable to large programs or software deployments.

Figure 1:
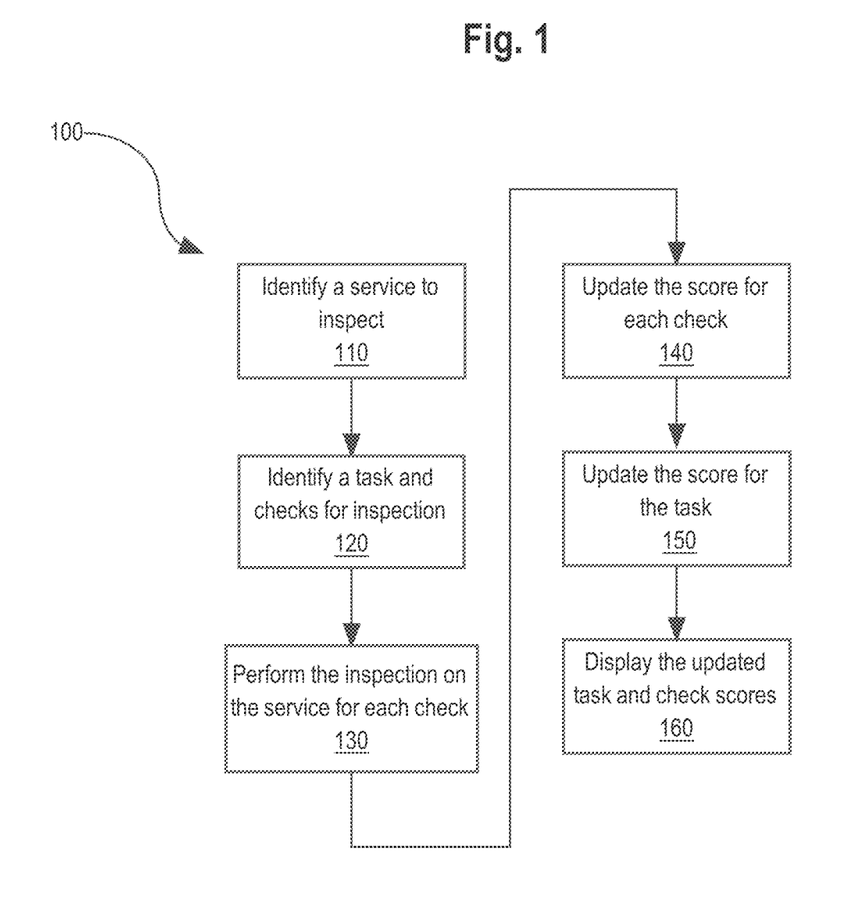
FIG. 1 is a flow diagram depicting a process for automating service maturity and estimation.

FIG. 1 is a flow diagram depicting an example computer-implemented process of automating service maturity and estimation.

In one embodiment, a computer-implemented process is programmed for first identifying a service which to be subjected to an inspection operation to determine the maturity of the service. A task is identified to be the basis for the inspection operation to determine the maturity of the service. The task may contain one or more checks that are programmed with criteria that represent optimal aspects of a service. A check may be an inspection operation performed on the service by comparing its programmed criteria against corresponding aspects of the service within a common framework for measuring and reporting on any deviations from the optimal state. Each check comprising the task may produce a resulting numeric check score and associated text artifact containing any explanatory notes or comments related to how the score was derived. The check score may represent how close the service aspects conform to the optimal criteria of the checks. During the inspection operation, the check scores of each check are updated in response to comparing the criteria of the checks to corresponding aspects of the service. A task score for the task comprising the checks and check scores is updated to reflect the overall conformity of the service with the criteria of the checks comprising the task. Optionally, a task score is output or displayed with the check scores and their associated text artifacts to provide a visual representation of a service maturity level compared with the task.

Referring now to FIG. 1, in an embodiment, a process 100 starts at step 110 by identifying a service to be subject to an inspection operation to determine service maturity. Identifying the service may comprise retrieving a name of a service from a configuration file or configuration data; receiving a programmatic call from another program, service or system that identifies a service by name or other identifier and requests inspection; or receiving input data in a graphical user interface, command-line interface or other facility that specifies a service by name or other identifier. In various embodiments, the service may be a computer program, a software application, a service component in a modular application, or a microservice component in another service. In various embodiments, the service is a microservice that is implemented as a modular part of a larger software application that is capable of running independently from the larger applications. For example, the service may be a microservice implemented as a modular part of a larger software application that determines, independent from the larger software application, that the application has completed a security risk survey prior to executing other microservices.

At step 120, a task is identified by mapping the service to a set of programmatic checks relevant to the service. The criteria for mapping a service to a check may comprise values for comparison; rules; programmed tests; key-value pairs; or a specification of other criteria in other machine-readable, machine-executable form. The task may contain one or more checks. Each of the one or more checks may contain one or more criteria representing optimal criteria to which a service should conform. A task may contain a task score which may be calculated as the aggregate of each of the one or more checks calculated as a result of executing the checks against the associated service. For example, in the security risk survey example mentioned above, a task may contain one or more checks of various security risks that could be present in a service and which a mature service should avoid. One check may contain criteria specifying that all service components in the service contain links utilizing the Hyper Text Transfer Protocol Secure (HTTPS) protocol for website connections. Another check may contain criteria specifying that all service components in the service set proper Cross Origin Resource Sharing (CORS) headers. Other checks may inspect operational areas of concern, not only security checks. For example, a check may contain criteria for inspecting the quality of documentation associated with a service or criteria for evaluating the staffing of an on-call roster associated with the service. The structure and execution of a task is described in other sections herein.

At step 130, an inspection operation to determine service maturity is executed for each check in the identified task. The inspection operation may be performed for all checks, a subset of checks, or none of the checks in the identified task. An inspection operation may comprise executing a comparison of values in a check as compared to a set of source code, executing a segment of code contained in the check, or calling a method or service identified in the check. The inspection operation may proceed by identifying one or more criteria in a check and determining whether one or more of those criteria are met by corresponding elements of the service or a component of the service. For example, in the security risk survey examples mentioned above, a check containing criteria specifying that all service components contain links utilizing the HTTPS security protocol may be compared to each component of the service containing website hyperlink text. The inspection operation may determine that only a subset of service components contain website connection text utilizing the HTTPS security protocol while other components do not. In an embodiment, the document inspection operation may be performed on a third-party service to determine the quality of documentation related to the third-party service. In a further embodiment, at least one of the checks may retrieve data from a corporate documentation repository to verify that the third-party service has a documented disaster recovery plan, a source code repository, and a published and completed on-call staff roster.

At step 140, one or more check scores corresponding to the one or more checks utilized in the inspection operation are updated to reflect results of the inspection operations and/or a level or degree of service conformity to the check criteria. The check scores may start at a minimum, maximum, or intermediate score value prior to the inspection operation and may be updated based on the results of the inspection operation. In various embodiments, the determination that a component does not match the criteria of a check may reduce the corresponding check score by a predetermined number. In various embodiments, the determination that a component matches the criteria of a check may increase the corresponding check score by a predetermined number. In the security risk survey examples mentioned above, the determination that a number of service components containing website connection text utilize the HTTPS security protocol may increase the check score of that check. Further, the determination that a service does not have adequate staffing for an associated on-call roster may reduce the check score of that check.

At step 150, a task score representing the relative maturity of the service for all checks may be updated. The task score may be updated in any manner utilizing the one or more updated check scores. In an embodiment, the task score may be equivalent to the lowest check score. In another embodiment, the task score may be the weighted average of all check scores in the task. In a further embodiment, the weight comprising a weighted average may be associated with relative business compliance values and the check scores may be calculated as the ratio of the absolute value of the difference between the updated check score and a minimum score value, and the absolute value of the difference between a maximum score value and a minimum score value. In the security risk survey examples mentioned above, the task score may be the weighted average of the updated check scores corresponding to the HTTPS and documentation checks, wherein the documentation checks correspond to a business compliance weight value lower than a business compliance weight value corresponding to the HTTPS or CORS security checks.

At step 160, the updated scores may be displayed. In various embodiments, all, none or a subset of the task and check scores may be displayed. In various embodiments, the task and check scores may be displayed to a user of a computing device utilizing a graphical user interface. An example of a computing device and a graphical user interface will be discussed in further later below.

Figure 4:
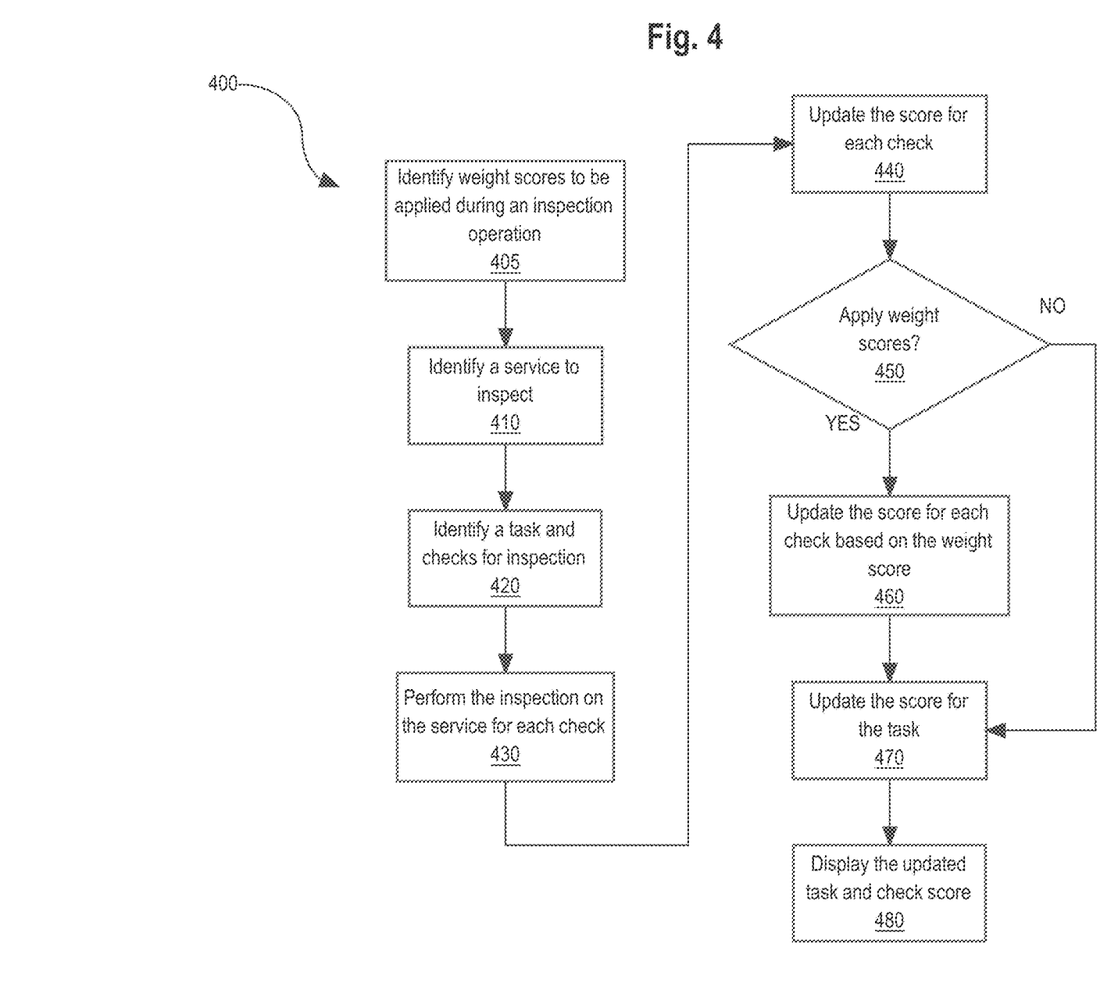
FIG. 4 is a flow diagram depicting a process for automating service maturity and estimation further employing a weighing metric.

FIG. 4 is a flow diagram depicting a process for automating service maturity and estimation further employing a weighing metric.

In one embodiment, a process comprises first identifying a set of weight scores corresponding to a service or task to be involved in an inspection operation. A service to be subjected to the inspection operation to determine the maturity of the service is identified. A task is identified to be the basis for the inspection operation to determine the maturity of the service. The task comprises a number of checks that specify certain criteria that represent optimal aspects of a service. An inspection operation is performed on the service by checking the task, checks, and criteria of the checks against corresponding aspects of the service. Each check comprising the task has a check score which represents how closely the service aspects conform to the optimal criteria of the checks. During the inspection operation, the check scores of each check are updated when the criteria of the checks is compared to the corresponding aspects of the service. The weight scores may be applied, or not, to the updated check scores. If the weight scores are applied, the check scores are updated to reflect the altered check scores with the weighing metric. If the weight scores are not applied, or following the second update of the check scores, the task score is updated to reflect overall conformity of the service to the criteria of the checks comprising the task. This task score may be displayed along with the check scores as a visual representation of the service maturity level compared with the task.

Referring to FIG. 4, in an embodiment, a process 400 starts at step 405 by identifying a weight score which corresponds to a service, task, or check scores within a task. The weight scores may be one or more numerical scores which are similar or different to other weight scores. In various embodiments, a service, task, or checks may be mapped to one or more weight scores to aid in the identification of the service, task or checks in later steps.

At step 410, a service is identified to be subject to an inspection operation to determine service maturity. Identifying the service can take many forms. For example, the identification may be similar to the identifying step 110 in FIG. 1 or different. In various embodiments, the identifying of a service may further involve selecting a service which corresponds to the identified weight scores. For example, a service relating to security protocols in a software application may have a corresponding weight score indicating that the service is a higher priority service than other services in a software application and may be identified before other services.

At step 420, a task is identified containing criteria corresponding to optimal maturity criteria for an optimal version of the service. The identification of the task may be similar to the identification 120 in FIG. 1 or different. In various embodiments, identifying the task may further involve the selection of a task corresponding to the set of identified weight scores or a task containing checks corresponding to the identified weight scores. The weight scores for the various checks may be similar or different. For example, within a task there may be checks corresponding to security protocols in an optimally mature service component which have higher weight than other checks in the task which do not correspond to security protocols.

At step 430, the inspection operation to determine service maturity proceeds for each check in the identified task. The inspection operation may be similar to the inspection operation 130 in FIG. 1 or different. In various embodiments, the inspection operation to determine service maturity may begin by comparing checks corresponding to higher weight scores before comparing checks corresponding to lower weight scores, or vice-versa.

At step 440, one or more check scores corresponding to the one or more checks utilized in the inspection operation may be updated to reflect the service conformity to the check criteria. The updating of scores may be similar to the updating of scores 140 in FIG. 1 or different. In various embodiments, the updating of check scores begins by updating check scores of checks corresponding to higher weight scores before updating check scores of checks corresponding to lower weight scores, or vice versa.

At step 450, a decision is made as to whether to apply the one or more weight scores to the corresponding updated check scores. In various embodiments a service automatically applies the weight scores to the check score. In another embodiment, a system administrator may specific whether all, none, or a subset of the weight scores are applied to the check scores.

At step 460, if it is decided that the weight scores will be applied to the check scores, the check scores are updated based on the corresponding weight score for the check. In various embodiments, updating the check scores is based on a factor involving the updated values of the check scores and the value of the weight scores. For example, a check score having a score value less than the maximum possible score value may have its score value further decreased by a factor equivalent to the weight score.

At step 460, if it is decided that the weight scores will not be applied to the check scores, or subsequent to the updating of the check scores based on the weight scores, a task score representing the relative maturity of the service for all checks is updated 470. The task score may be updated in a manner similar to the updating 150 in FIG. 1 or in a different manner. In an embodiment, the task score may further be updated based on the one or more weight scores. For example, a task score having a score value less than an optimal score may have its score value further decreased by a factor equivalent to the weight score.

After the updating of the check scores 440, 460 and task score 470, the updated scores may by displayed 480. The displaying 480 may be similar to the displaying 160 in FIG. 1 or different. In various embodiments, the corresponding weight score may be displayed along with the updated check and/or task scores.

Figure 5:
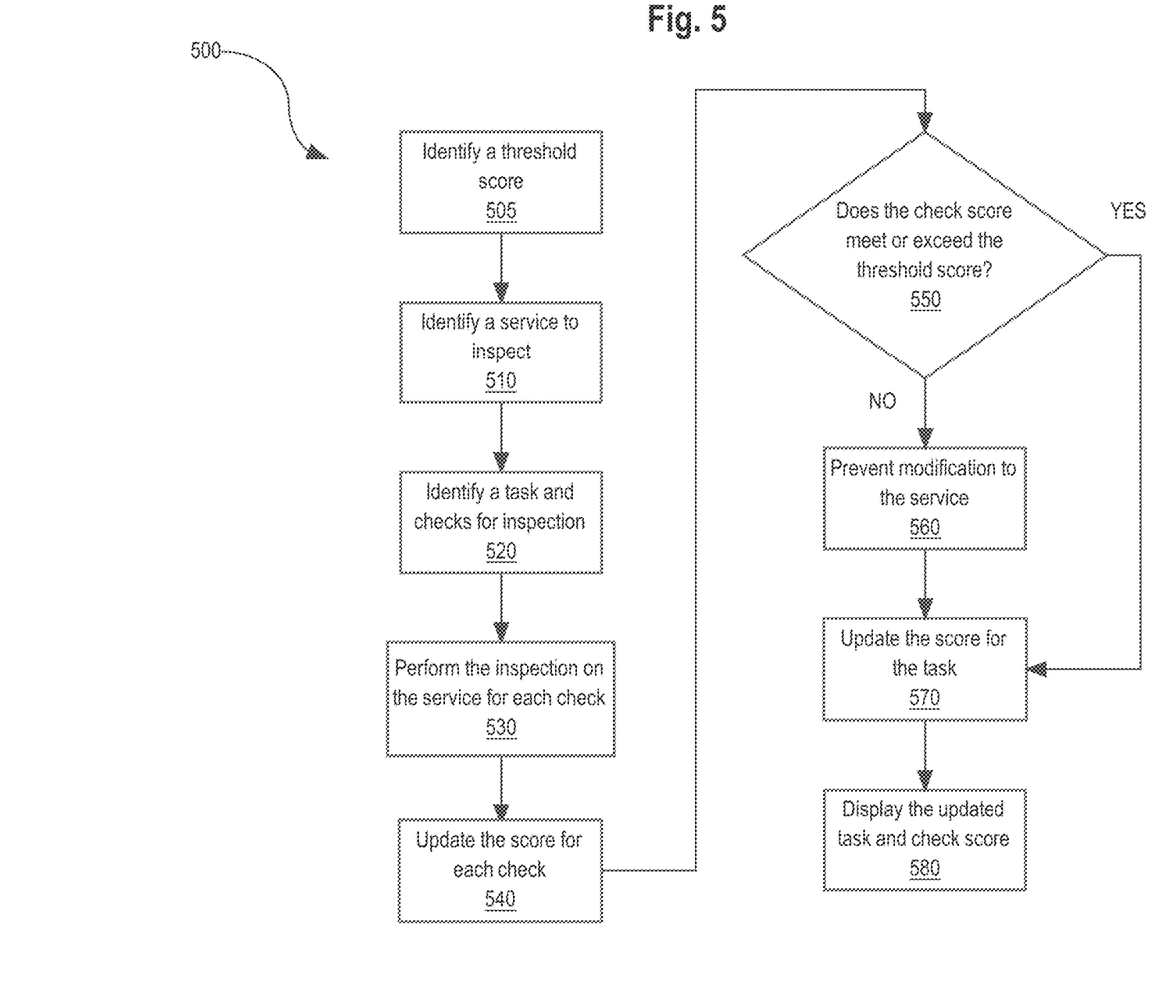
FIG. 5 is a flow diagram depicting a process automating service maturity and estimation further controlling service modification.

FIG. 5 is a flow diagram depicting a process automating service maturity and estimation further controlling service modification.

In one embodiment, a process comprises first identifying one or more threshold scores corresponding to a service or task which is involved in an inspection operation. A service to be subjected to an inspection operation to determine the maturity of the service is identified. A task is identified to be the basis for the inspection operation to determine the maturity of the service. The task contains a number of checks which specify certain criteria that represent optimal aspects of a service. An inspection operation is performed on the service by checking the task, checks, and criteria of the checks against corresponding aspects of the service. Each check comprising the task has a check score which represents how close in conformity the service aspects are to the optimal criteria of the checks. During the inspection operation, the check scores of each check are updated when the criteria of the checks is compared to the corresponding aspects of the service. The threshold scores may then be compared, or not, to the updated check scores. If the check scores do not meet or exceed a corresponding threshold score, the service containing the service component corresponding to the check containing the check score that did not meet the threshold score may restrict all changes to the service until the service is modified to comply with the check criteria. If the threshold score is met, or following the prevented execution of the service component, the task score is updated to reflect the overall conformity of the service with the criteria of the checks comprising the task. This task score is displayed along with the check scores as a visual representation of the service maturity level compared with the task.

Referring now to FIG. 5, in an embodiment, a process 500 starts at step 505 by first identifying one or more threshold scores. The threshold scores may be one or more numerical scores which are similar or different to other threshold scores. In various embodiments, a service, task, or checks may be mapped to one or more threshold scores to aid in the identification of the service, task or checks in later steps.

At step 510, a service is identified to be subject to an inspection operation to determine service maturity. The identification of the service can take many forms. For example, the identification may be similar to the identifying step 110 in FIG. 1, the identifying step 410 in FIG. 4, or different. In various embodiments, the identifying of a service may further involve selecting a service which corresponds to the identified threshold scores. For example, a service relating to security protocols in a software application may have a corresponding threshold score which indicates that the service is required to pass as threshold before implementation, compared to other services in the software application which may not need to meet such a requirement.

At step 520, a task is identified containing criteria corresponding to optimal maturity criteria for an optimal version of the service. The identification of the task may be similar to the identification 120 in FIG. 1, the identification 420 in FIG. 4, or different. In various embodiments, identifying of the task may further involve selecting a task corresponding to the set of identified threshold scores or a task containing checks corresponding to the identified threshold scores. The threshold scores for the various checks may be similar or different. For example, within a task there may be checks corresponding to security protocols in an optimally mature service component which must meet a higher threshold for execution than non-security-related checks before the service is implemented.

At step 530, the inspection operation to determine service maturity proceeds for each check in the identified task. The inspection operation may be similar to the inspection operation 130 in FIG. 1, 430 in FIG. 4, or different. In various embodiments, the inspection operation to determine service maturity begins by comparing checks which are subject to meeting a threshold score before comparing checks that are not required to meet a threshold score, or vice-versa.

At step 540, one or more check scores corresponding to the one or more checks utilized in the inspection operation are updated to reflect the service conformity to the check criteria. The updates of scores may be similar to the updating of scores 140 in FIG. 1, the updating of score 440 in FIG. 4, or different. In various embodiments, the updating of check scores begins by updating check scores of checks which must meet a threshold for execution before updating check scores of checks which do not have to meet a threshold, or vice versa.

At step 550, a determination may be made as to one or more check scores meet or exceed a corresponding threshold score. The comparison may be done by determining that a value in each check score meets, exceeds, or does not exceed a corresponding threshold score value. In various embodiments, each check in the task may be required to meet a single universal threshold score. In various embodiments, each check or a subset of checks may be required to meet one or more corresponding threshold scores each. In various embodiments, a human user may determine that one or more checks meets a threshold value manually.

At step 560, if it is decided that a particular check score does meet or exceed the threshold score, the service component corresponding to the check having the check score which did not meet the threshold score may restrict any modification of the service or a service component. In various embodiments, restriction may include preventing access to the service, preventing modification of the service or any service components, or restricting digital transfer of the service or service data. In various embodiments, the restriction will remain in place until another determination is made and the one or more check scores meet or exceed the corresponding threshold score.

At step 570, if a check score does meet or exceed a threshold, or subsequent to the stopping 560 of the execution of a service, a task score representing the relative maturity of the service for all checks is updated. The task score may be updated in a manner similar to the updating 150 in FIG. 1, the updating 470 in FIG. 4, or in a different manner. In an embodiment, the task score may be updated based only on those check scores which met or exceeded a corresponding threshold score. In another embodiment, the task score may be updated 570 based on a combination of check scores which met a corresponding threshold and a combination of check scores which did not meet a corresponding threshold.

At step 580, the updated scores may by displayed 580. The displaying may be similar to the displaying 160 in FIG. 1, or the displaying 480 in FIG. 4, or different. In various embodiments, the corresponding threshold score may be displayed along with the updated check and/or task scores. In a further embodiment, an indicator may be displayed indicating that a check score or task score did not meet the corresponding threshold score.

In an embodiment not pictured in FIG. 5, the determination that a check score does not meet or exceed a threshold value may further identify the corresponding service component corresponding to the check containing the particular check score that does not meet or exceed the threshold value. In a further embodiment, a corrected service component which is an optimally mature version of the identified corresponding service component is received and replaces the identified service component in the service which has been subjected to inspection. In a further embodiment, an indicator may be displayed indicating that the identified service component has been replaced by the corrected service component.

Example Systems

Figure 2:
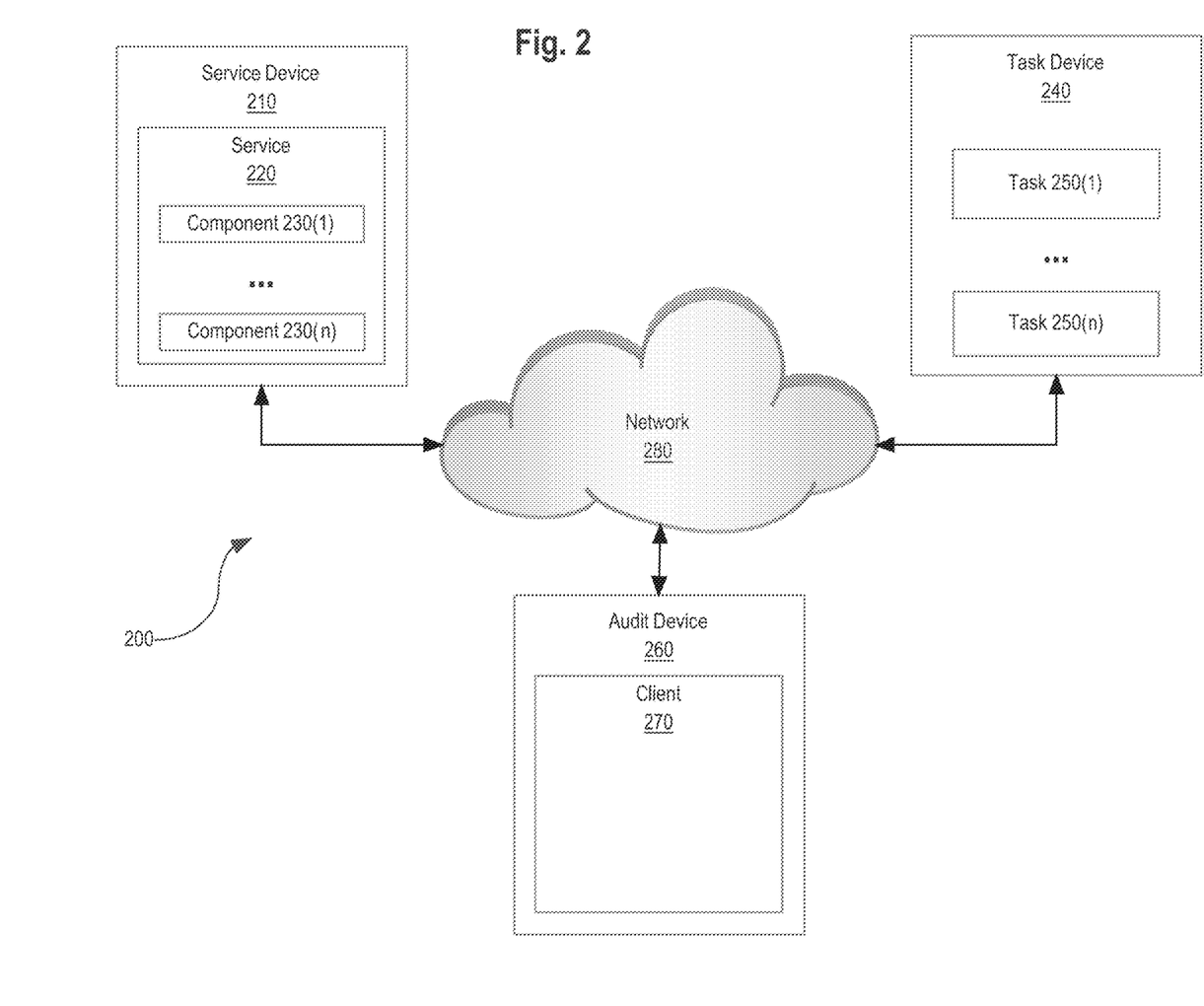
FIG. 2 is a block diagram depicting a system for automating service maturity and estimation.

FIG. 2 is a block diagram depicting a system for automating service maturity and estimation. As depicted in system 200, numerous electronic devices 210, 240, 260 are all connected to a network 280. The network 280 may be the internet, an intranet, a wide area network, a local interface network, a local area network, a bus connected network, or any other kind of network, such as those described herein. The network may be capable of facilitating the exchange of data between the numerous electronic devices.

Service device 210 is connected to network 280. Service device 210 may be any kind of electronic hardware device capable of storing electronic data. A more detailed example of an electronic hardware device is described below. In various embodiments, service device 210 may be a database device. Service device 210 may store one or more software services 220 electronically. A service 220 may be a software application, a component of a software application, or any other kind of software service, such as those described herein. A service 220 may contain one or more components 230(1)-230(n) which make up the software service 220.

Task device 240 is connected to network 280. Task device 240 may be any kind of electronic hardware device capable of storing electronic data. In various embodiments, task device 240 may be a database device. Task device 240 may store one or more tasks 250(1)-250(n). A more detailed example of a task 250 is described below.

Audit device 260 is connected to network 280. Audit device 260 may be any kind of electronic hardware device capable of storing electronic data. In various embodiments, audit device 260 is a user device capable of storing and executing a user client application 270 which performs the inspection operations 110-160, 405-480, and/or 505-580.

In various embodiments, audit device 260 may receive data over network 280 from service device 210 including information about services 220, and service components 230. In various embodiments, audit device 260 may receive data over network 280 from task device 240 including information about tasks 250. In various embodiments service device 210 and/or task device 240 may receive data over network 280 from audit device 260 related to performing steps for inspection operations 110-160, 405-480, and/or 505-580. In various embodiments a device may be one of, or any combination of, service device 210, task device 240 and/or audit device 260.

Figure 6:
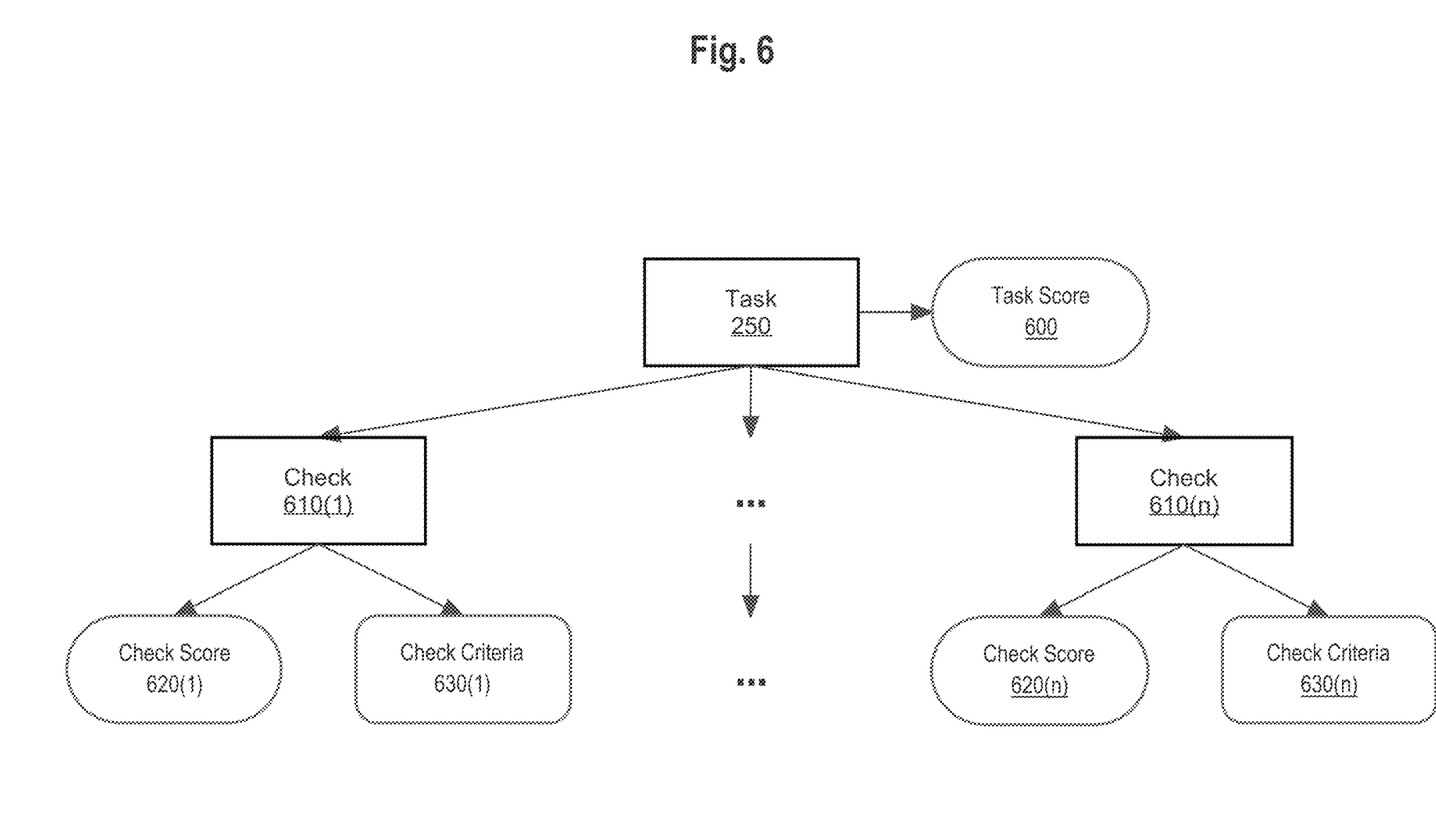
FIG. 6 is a block diagram depicting the anatomy of task and check entities for automating service maturity and estimation.

FIG. 6 is a block diagram depicting the anatomy of task and check entities for automating service maturity and estimation. A task 250 is shown comprising several subparts, among them a task score 600 and one or more checks 610(1)-610(n). The one or more checks 610 each contain a check score 620(1)-620(n) and check criteria 630(1)-630(n).

Task score 600 may be a part of a task 250 and may be any kind of electronic data which may be involved in the use of a task score as described, for example, by process steps 150-160, 470-480, and/or 570-580. Checks 610(1)-610(n) may be a part of task 250 and may be any kind of electronic data which may be involved in the use of a check score as described, for example, at process steps 120-160, 420-480, and/or 520-580. Each check 610 in a task 250 may further comprise a check score 620 and check criteria. A check score 620 may be any kind of electronic data which may be involved in the use of a check score as described, for example, at process steps 140-180, 440-480, and/or 540-580. A check criteria 630 may be any kind of electronic data which may be involved in the use of check criteria for comparison to a corresponding service component 230, for example, at process steps 130-140, 430-440, and/or 530-540.

In various embodiments, a check criteria 630 may contain more than one criterion which may be compared 130 to a service component 230 and which may contribute to the calculation and updating 140 of the check score 610. In various embodiments, a check criterion 630 may be excluded from the inspection process 130 or may be included in an inspection process 130 for a separate service 220 and a separate task 250 which does not contain the original check criteria 630.

Example Interfaces

Figure 7:
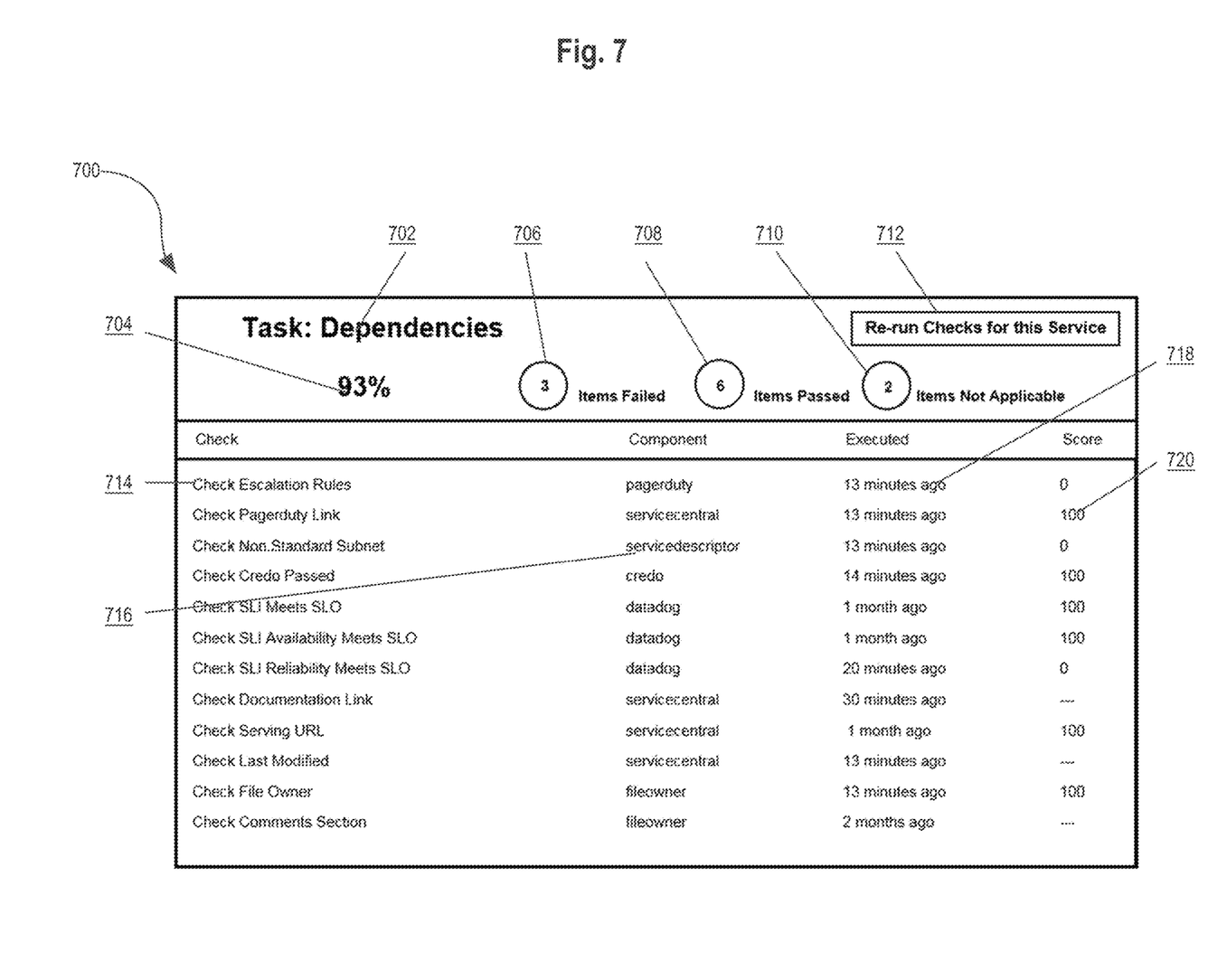
FIG. 7 is an example user interface for automating service maturity and estimation.

FIG. 7 is an example user interface for automating service maturity and estimation. As depicted in example interface 700, the results of an inspection operation may be displayed 180 on any computer device medium, including a user auditing device 260 running an auditing client 270. A task indicator 702 may be displayed to indicate which task 250 was involved in the inspection operation 130. A task score indicator 704 may be displayed to indicate the resulting task score 600 of the task 250 after it has been updated 170.

A failure indicator 706 may display the number of checks 610 which did not pass a threshold score 550 as a visual indicator. A success indicator 708 may display the number of checks 610 which did pass a threshold score 560 as a visual indicator. A "not-applicable" indicator 710 may display the number of checks 610 which the system did not update a check score 140 for or the number of checks which were not subject to the inspection operation 130. A manual inspection button 712 may cause the auditing client 270 to perform the inspection operation 130 immediately. In various embodiments, the inspection operation 130 may take place automatically over a regular period of time, such as every month, every week or every day.

Check indicator 714 may be displayed to indicate a check 610 which was the subject of an inspection operation 130. Check 610 may correspond to service component 230 which was the subject of the inspection operation 130 and is displayed by the component indicator 716. Time execution indicator 718 may display the amount of time that has passed since check 610 and service component 230 were subjected to the inspection operation 130. In an embodiment, the time execution indicator 718 may be a static timer with a fixed value or a dynamic timer with a changing value which updates at a time interval. Check score indicator 720 may display the check score 610 resulting from the updating 140 for the check score's 620 check 610 as a result of the inspection operation 130.

Additional Example Embodiments

In an embodiment, the process for automating service maturity and estimation described above may further comprise determining whether the service has completed a security risk assessment survey.

In an embodiment, the process for automating service maturity and estimation described above may further comprise determining whether the service is registered with a call schedule, and in response thereto, further determining whether all user accounts associated with a call schedule for the service have created and stored contact data identifying one or more contact methods.

In an embodiment, the process for automating service maturity and estimation described above may further comprise determining whether the service is executing a number of cross-environment programmatic calls that exceeds a stored maximum allowed number of cross environment programmatic calls.

In an embodiment, the process for automating service maturity and estimation described above may further comprise determining whether the service has defined a service level objective in a database, and in response thereto, determining whether one or more service level indicators of the service satisfy the service level objective.

In an embodiment, the process for automating service maturity and estimation described above may further comprise determining whether the service is associated with one or more trouble tickets in a ticket tracking system.

In an embodiment, the check score 620 may be any numerical value between a minimum and maximum value specified at the creation of the check. In a further embodiment, a check score 620 may be represented by an indicator 720 of a relative percentile, where the relative percentile is calculated by dividing the absolute value of the difference between the check score 620 after updating 140 and the minimum value, by the absolute value of the difference between the maximum value and the minimum value. In an embodiment the task score 600 may be any numerical value between a minimum and maximum value specified at the creation of the task. In a further embodiment, the task 250 may be represented by an indicator 704 of a relative percentile, where the relative percentile is calculated by dividing the absolute value of the difference between the task score 600 after updating 150 and the minimum value, by the absolute value of the difference between the maximum value and the minimum value.

In an embodiment, the criteria 630 comprising a check must conform to a set of rules. For example, a task 250 may be used to inspect a service 220 which is implemented by source code written in a particular programming language. The task may be bound by rules requiring all checks 610 and all criteria of checks 630 to inspect service components 230 for conformity with that particular programming language. In an embodiment, the set of rules may specify that a check score 610 may only comprise a score between a minimum and maximum value and may not exceed the range between the minimum and maximum value range. In an additional embodiment, the set of rules may specify that the inspection operation 130 may exclude checks from being involved in the maturity determination which do not conform to the set of rules.

In an embodiment, relative weight scores may be identified 405 by an additional device which is not the service device 210, task device 240, or audit device 260. The additional device may be connected to network 280 and may be capable of sending and receiving data to and from the service device 210, task device 240 and/or audit device 260.

In an embodiment, additional indicators may be shown on example interface 700 or any other interface indicating the checks 610 which did not meet the threshold score 550 and displaying the criteria 630 which was not met by the corresponding service component 230. In a further embodiment, example interface 700 may further indicate to a user which portions of the criteria 630 were not met by the corresponding service component 230 and suggest ways to alter the service component to meet the criteria 630.

In an embodiment, a separate scheduling module may schedule times at which the inspection operation 130 may take place at regular intervals and further display, on the example interface 700, the indicator 718 corresponding to the time the last scheduled inspection operation 130 has taken place.

In an embodiment, the task score and check scores are displayed 180 on both the example interface 700, 704, 720 and/or an additional device which is not the audit device 260.

Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 3:
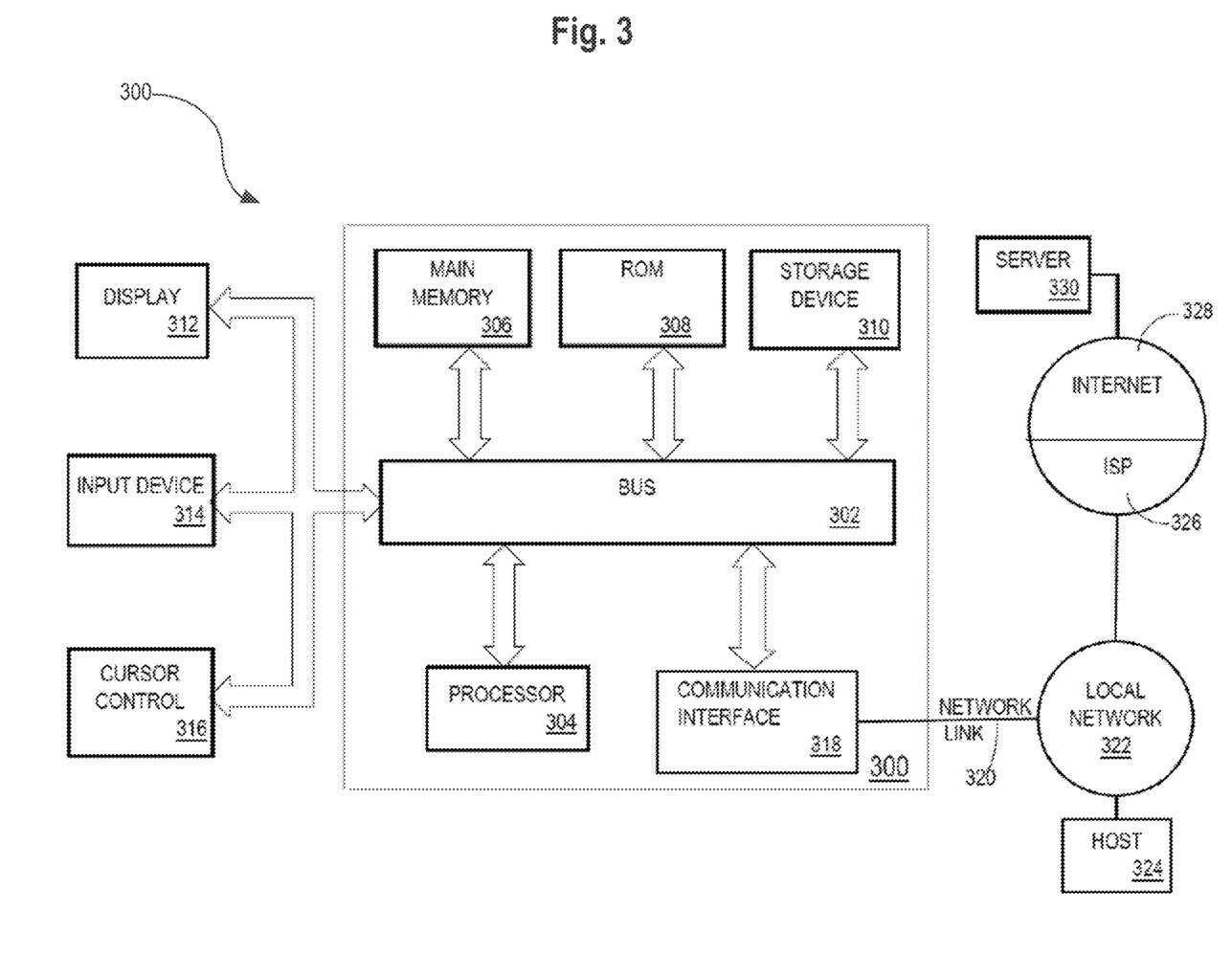
FIG. 3 depicts example hardware for automating service maturity and estimation.

FIG. 3 is a block diagram that illustrates an example computer system with which an embodiment may be implemented. In the example of FIG. 3, a computer system 300 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 300 includes an input/output (I/O) subsystem 302 which may include a bus and/or other communication mechanism(s) for communicating information and/or instructions between the components of the computer system 300 over electronic signal paths. The I/O subsystem 302 may include an I/O controller, a memory controller and at least one I/O port. The electronic signal paths are represented schematically in the drawings, for example as lines, unidirectional arrows, or bidirectional arrows.

At least one hardware processor 304 is coupled to I/O subsystem 302 for processing information and instructions. Hardware processor 304 may include, for example, a general-purpose microprocessor or microcontroller and/or a special-purpose microprocessor such as an embedded system or a graphics processing unit (GPU) or a digital signal processor or ARM processor. Processor 304 may comprise an integrated arithmetic logic unit (ALU) or may be coupled to a separate ALU.

Computer system 300 includes one or more units of memory 306, such as a main memory, which is coupled to I/O subsystem 302 for electronically digitally storing data and instructions to be executed by processor 304. Memory 306 may include volatile memory such as various forms of random-access memory (RAM) or other dynamic storage device. Memory 306 also may be used for storing temporary variables or other intermediate information during execution of instructions to be executed by processor 304. Such instructions, when stored in non-transitory computer-readable storage media accessible to processor 304, can render computer system 300 into a special-purpose machine that is customized to perform the operations specified in the instructions.

Computer system 300 further includes non-volatile memory such as read only memory (ROM) 308 or other static storage device coupled to I/O subsystem 302 for storing information and instructions for processor 304. The ROM 308 may include various forms of programmable ROM (PROM) such as erasable PROM (EPROM) or electrically erasable PROM (EEPROM). A unit of persistent storage 310 may include various forms of non-volatile RAM (NVRAM), such as FLASH memory, or solid-state storage, magnetic disk or optical disk such as CD-ROM or DVD-ROM and may be coupled to I/O subsystem 302 for storing information and instructions. Storage 310 is an example of a non-transitory computer-readable medium that may be used to store instructions and data which when executed by the processor 304 cause performing computer-implemented methods to execute the techniques herein.

The instructions in memory 306, ROM 308 or storage 310 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 300 may be coupled via I/O subsystem 302 to at least one output device 312. In one embodiment, output device 312 is a digital computer display. Examples of a display that may be used in various embodiments include a touch screen display or a light-emitting diode (LED) display or a liquid crystal display (LCD) or an e-paper display. Computer system 300 may include other type(s) of output devices 312, alternatively or in addition to a display device. Examples of other output devices 312 include printers, ticket printers, plotters, projectors, sound cards or video cards, speakers, buzzers or piezoelectric devices or other audible devices, lamps or LED or LCD indicators, haptic devices, actuators or servos.

At least one input device 314 is coupled to I/O subsystem 302 for communicating signals, data, command selections or gestures to processor 304. Examples of input devices 314 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 316, which may perform cursor control or other automated control functions such as navigation in a graphical interface on a display screen, alternatively or in addition to input functions. Control device 316 may be a touchpad, a mouse, a trackball, or cursor direction keys for communicating direction information and command selections to processor 304 and for controlling cursor movement on display 312. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 314 may include a combination of multiple different input devices, such as a video camera and a depth sensor.

In another embodiment, computer system 300 may comprise an internet of things (IoT) device in which one or more of the output device 312, input device 314, and control device 316 are omitted. Or, in such an embodiment, the input device 314 may comprise one or more cameras, motion detectors, thermometers, microphones, seismic detectors, other sensors or detectors, measurement devices or encoders and the output device 312 may comprise a special-purpose display such as a single-line LED or LCD display, one or more indicators, a display panel, a meter, a valve, a solenoid, an actuator or a servo.

When computer system 300 is a mobile computing device, input device 314 may comprise a global positioning system (GPS) receiver coupled to a GPS module that is capable of triangulating to a plurality of GPS satellites, determining and generating geo-location or position data such as latitude-longitude values for a geophysical location of the computer system 300. Output device 312 may include hardware, software, firmware and interfaces for generating position reporting packets, notifications, pulse or heartbeat signals, or other recurring data transmissions that specify a position of the computer system 300, alone or in combination with other application-specific data, directed toward host 324 or server 330.

Computer system 300 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 300 in response to processor 304 executing at least one sequence of at least one instruction contained in main memory 306. Such instructions may be read into main memory 306 from another storage medium, such as storage 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 310. Volatile media includes dynamic memory, such as memory 306. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 302. Transmission media can also take the form of acoustic or light waves, such as those generated during radio-wave and infra-red data communications.

Various forms of media may be involved in carrying at least one sequence of at least one instruction to processor 304 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 300 can receive the data on the communication link and convert the data to a format that can be read by computer system 300. For instance, a receiver such as a radio frequency antenna or an infrared detector can receive the data carried in a wireless or optical signal and appropriate circuitry can provide the data to I/O subsystem 302 such as place the data on a bus. I/O subsystem 302 carries the data to memory 306, from which processor 304 retrieves and executes the instructions. The instructions received by memory 306 may optionally be stored on storage 310 either before or after execution by processor 304.

Computer system 300 also includes a communication interface 318 coupled to bus 302. Communication interface 318 provides a two-way data communication coupling to network link(s) 320 that are directly or indirectly connected to at least one communication networks, such as a network 322 or a public or private cloud on the Internet. For example, communication interface 318 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 322 broadly represents a local area network (LAN), wide-area network (WAN), campus network, internetwork or any combination thereof. Communication interface 318 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 318 sends and receives electrical, electromagnetic or optical signals over signal paths that carry digital data streams representing various types of information.

Network link 320 typically provides electrical, electromagnetic, or optical data communication directly or through at least one network to other data devices, using, for example, satellite, cellular, Wi-Fi, or BLUETOOTH technology. For example, network link 320 may provide a connection through a network 322 to a host computer 324.

Furthermore, network link 320 may provide a connection through network 322 or to other computing devices via internetworking devices and/or computers that are operated by an Internet Service Provider (ISP) 326. ISP 326 provides data communication services through a world-wide packet data communication network represented as internet 328. A server computer 330 may be coupled to internet 328. Server 330 broadly represents any computer, data center, virtual machine or virtual computing instance with or without a hypervisor, or computer executing a containerized program system such as DOCKER or KUBERNETES. Server 330 may represent an electronic digital service that is implemented using more than one computer or instance and that is accessed and used by transmitting web services requests, uniform resource locator (URL) strings with parameters in HTTP payloads, API calls, app services calls, or other service calls. Computer system 300 and server 330 may form elements of a distributed computing system that includes other computers, a processing cluster, server farm or other organization of computers that cooperate to perform tasks or execute applications or services. Server 330 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 330 may comprise a web application server that hosts a presentation layer, application layer and data storage layer such as a relational database system using structured query language (SQL) or no SQL, an object store, a graph database, a flat file system or other data storage.

Computer system 300 can send messages and receive data and instructions, including program code, through the network(s), network link 320 and communication interface 318. In the Internet example, a server 330 might transmit a requested code for an application program through Internet 328, ISP 326, local network 322 and communication interface 318. The received code may be executed by processor 304 as it is received, and/or stored in storage 310, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 304. While each processor 304 or core of the processor executes a single task at a time, computer system 300 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A computer-implemented method comprising:
receiving, by a computing device, a first input identifying a computer program that is currently executing and is implemented as a microservice, the computer program comprising a set of service components;
receiving, by the computing device, a second input identifying a task comprising one or more checks, each check of the one or more checks comprising one or more criterion indicating a set of rules;
while the computer program continues executing, determining, by the computing device and for each check of the one or more checks, whether the set of service components conform to the set of rules indicated by the one or more criterion;
determining, by the computing device, a check score for each check, each check score indicating a level of conformity a respective service component of the set of service components has with the set of rules indicated by the one or more criterion;
determining, by the computing device, that at least one check score does not meet a threshold score value;
identifying, by the computing device, a service component of the set of service components corresponding to the at least one check score that does not meet the threshold score value;
in response to determining that the at least one check score does not meet the threshold score value and identifying the service component:
preventing, by the computing device, execution of the microservice;
restricting, by the computing device, a modification of the service component and the microservice;
receiving, by the computing device, a corrected service component;
replacing, by the computing device, the service component with the corrected service component;
determining, by the computing device, a task score of the task based, at least in part, an average of at least one updated check score of the corrected service component; and
causing display of, by the computing device:
an indicator specifying that the service component is replaced; and
a timer for each check, each timer indicating an amount of time that has passed since a respective check score was updated.

2. The method of claim 1, further comprising:
receiving one or more weight scores, each weight score corresponding to a respective check of the one or more checks; and
updating the respective check score for each check, based on, at least in part, a corresponding weight score.

3. The method of claim 1, further comprising:
determining a subset of checks of the one or more checks have a corresponding service component that is not part of the microservice; and
causing display of an indicator for each of the subset of checks.

4. The method of claim 1, wherein at least one determination involves a check that is not part of the task.

5. The method of claim 1, wherein determining, for each check, whether the respective service component satisfies the one or more criterion comprises determining whether the microservice has completed a security risk assessment survey.

6. The method of claim 1, wherein determining, for each check, whether the respective service component satisfies the one or more criterion comprises determining whether the microservice is registered with a call schedule and, in response thereto, further determining whether all user accounts associated with the call schedule have created and stored contact data identifying one or more contact methods.

7. The method of claim 1, wherein determining, for each check, whether the respective service component satisfies the one or more criterion comprises determining whether the microservice is executing a number of cross-environment programmatic calls that exceeds a stored maximum allowed number of cross-environment programmatic calls.

8. The method of claim 1, wherein determining, for each check, whether the respective service component satisfies the one or more criterion comprises determining whether the microservice has defined a service level objective in a database and, in response thereto, determining whether one or more service level indicators of the microservice satisfy the service level objective.

9. The method of claim 1, wherein determining, for each check, whether the respective service component satisfies the one or more criterion comprises determining whether the microservice is associated with one or more trouble tickets in a ticket tracking system.

10. One or more non-transient computer readable storage media comprising instructions which, when executed by a processor, cause the processor to:
receive a first input identifying a computer program that is currently executing and is implemented as a microservice, the computer program comprising a set of service components;
receive a second input identifying a task comprising one or more checks, each check of the one or more checks comprising one or more criterion indicating a set of rules;
while the computer program continues executing, determine, for each check of the one or more checks, whether the set of service components conform to the set of rules indicated by the one or more criterion;
determine a check score for each check, each check score indicating a level of conformity a respective service component of the set of service components has with the set of rules indicated by the one or more criterion;
determine that at least one check score does not meet a threshold score value;
identify a service component of the set of service components corresponding to the at least one check score that does not meet the threshold score value;
in response to determining that the at least one check score does not meet the threshold score value and identifying the service component:
prevent execution of the microservice;
restrict a modification of the service component and the microservice;
receive a corrected service component; and
replace the service component with the corrected service component;
determine a task score of the task based, at least in part, an average of at least one updated check score of the corrected service component; and
cause display of:
an indicator specifying that the service component is replaced; and
a timer for each check, each timer indicating an amount of time that has passed since a respective check score was updated.

11. The non-transient computer readable storage media of claim 10, wherein the instructions further cause the processor to:

receive one or more weight scores, each weight score corresponding to a respective check of the one or more checks; and
update the respective check score for each check, based on, at least in part, a corresponding weight score.

12. The non-transient computer readable storage media of claim 10, wherein the instructions further cause the processor to:
determine a subset of checks of the one or more checks have a corresponding service component that is not part of the microservice; and
cause display of an indicator for each of the subset of checks.

13. The non-transient computer readable storage media of claim 10, wherein causing the processor to perform at least one determination involves a check that is not part of the task.

14. The non-transient computer readable storage media of claim 10, wherein causing the processor to determine, for each check, whether the respective service component satisfies the one or more criterion comprises causing the processor to determine whether the microservice has completed a security risk assessment survey.

15. The non-transient computer readable storage media of claim 10, wherein causing the processor to determine, for each check, whether the respective service component satisfies the one or more criterion comprises causing the processor to determine whether the microservice is registered with a call schedule and, in response thereto, further determining whether all user accounts associated with the call schedule have created and stored contact data identifying one or more contact methods.

16. The non-transient computer readable storage media of claim 10, wherein causing the processor to determine, for each check, whether the respective service component satisfies the one or more criterion comprises causing the processor to determine whether the microservice is executing a number of cross-environment programmatic calls that exceeds a stored maximum allowed number of cross-environment programmatic calls.

17. The non-transient computer readable storage media of claim 10, wherein causing the processor to determine, for each check, whether the respective service component satisfies the one or more criterion comprises causing the processor to determine whether the microservice has defined a service level objective in a database and, in response thereto, determining whether one or more service level indicators of the microservice satisfy the service level objective.

* * * * *